(12) United States Patent
Kawamata et al.

(10) Patent No.: US 11,716,980 B2
(45) Date of Patent: Aug. 8, 2023

(54) SPINNING REEL

(71) Applicant: Shimano Inc., Sakai (JP)

(72) Inventors: Atsushi Kawamata, Sakai (JP); Akira Niitsuma, Sakai (JP); Satoshi Ikebukuro, Sakai (JP); Kei Saito, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 17/836,220

(22) Filed: Jun. 9, 2022

(65) Prior Publication Data

US 2023/0059668 A1    Feb. 23, 2023

(30) Foreign Application Priority Data

Aug. 23, 2021  (JP) ................. 2021-135576

(51) Int. Cl.
*A01K 89/01*         (2006.01)
(52) U.S. Cl.
CPC ............................ *A01K 89/01127* (2015.05)
(58) Field of Classification Search
CPC ........ A01K 89/01082; A01K 89/01083; A01K 89/0108
See application file for complete search history.

(56) References Cited

U.S. PATENT DOCUMENTS 9,706,761 B1 * 7/2017 Ochiai ............ A01K 89/01083
2001/0054660 A1 * 12/2001 Sato ................... A01K 89/0108
242/231

FOREIGN PATENT DOCUMENTS

| DE | 102018122460 A1 * | 3/2019 | ............ A01K 89/01 |
| EP | 3195725 A2 * | 7/2017 | ............ A01K 89/01 |
| JP | H08298902 A * | 11/1996 | ........... A01K 89/015 |
| JP | 2014-124183 A | 7/2014 | |

* cited by examiner

*Primary Examiner* — Emmanuel M Marcelo
(74) *Attorney, Agent, or Firm* — United IP Counselors, LLC

(57) ABSTRACT

A spinning reel includes a reel body, a rotor, a bail arm, a rod, a coil spring, a swing member, and a tubular member. The rotor rotates with respect to the reel body. The bail arm is configured to swing with respect to the rotor. The bail arm has a bail and a bail support member that supports one end of the bail. The rod is connected to the bail support member. The coil spring is disposed around the outer circumference of the rod and presses the rod toward the bail support member. The swing member has a bottom that supports the coil spring and is swingably supported by the rotor. The tubular member is supported by the swing member. The tubular member is disposed in the inner circumference of the coil spring. The rod is configured to slide in accordance with a swing movement of the bail arm.

10 Claims, 8 Drawing Sheets

SPINNING REEL

CROSS-REFERENCE TO RELATED APPLICATIONS

This application claims priority to Japanese Patent Application No. 2021-135576, filed Aug. 23, 2021. The contents of that application are incorporated by reference herein in their entirety.

TECHNICAL FIELD

The present invention relates to spinning reels.

BACKGROUND ART

A spinning reel equipped with a bail reversing mechanism that holds a bail arm in either a fishing-line winding posture or a fishing-line releasing posture is known. The bail reversing mechanism disclosed in Japanese Patent Application Publication No. 2014-124183 returns the bail arm from the fishing-line releasing posture to the fishing-line winding posture in accordance with the rotation of the rotor in the fishing-line winding direction. The bail reversing mechanism has a cylindrical swing member, a coil spring housed in the swing member, and a rod. The rod is slidably supported in a support hole penetrating through the bottom of the swing member and swings in accordance with the swing member.

In the bail reversing mechanism of Japanese Patent Application Publication No. 2014-124183, the support hole of the swing member extends in the direction away from the coil spring. In such a configuration, the total length of the rod needs to be increased in order to slidably support the rod in the support hole. As the total length of the rod becomes longer, the swing range of the rod also becomes greater, and the cover member covering the outside of the rotor arm may become larger in order to secure the swing range.

The object of the present invention is to provide a spinning reel that can shorten the overall length of a rod connected to a bail arm.

BRIEF SUMMARY

A spinning reel according to one aspect of the present invention has a reel body, a rotor, a bail arm, a coil spring, a swing member, and a tubular member. The rotor is configured to be rotatable with respect to the reel body. The bail arm is configured to be swingable with respect to the rotor. The bail arm has a bail and a bail support member that supports one end of the bail. A rod is connected to the bail support member. The coil spring is disposed around the outer circumference of the rod and presses the rod toward the bail support member. The swing member has a bottom that supports the coil spring and is swingably supported by the rotor. The tubular member is supported by the swing member. The tubular member is disposed in the inner circumference of the coil spring, and the rod slides in accordance with the swing movement of the bail arm.

In this spinning reel, the rod slides with the tubular member disposed in the inner circumference of the coil spring in accordance with the swinging of the bail arm. In other words, the rod is slidably supported by the tubular member in the inner circumference of the coil spring, which allows to reduce the overall length of the rod. As a result, the swing range of the rod becomes smaller, which prevents a cover member covering the outside of the rotor arm from becoming larger, for example.

The tubular member may be integral with the swing member. In this case, the number of parts can be reduced.

The tubular member may be separate from the swing member. The coil spring may press the tubular member toward the bottom of the swing member. In this case, it is easier to increase the overall length of the tubular member than a case where the tubular member and the swing member are integrally formed. In addition, the positional relationship between the swing member and the tubular member can be maintained by the pressing force of the coil spring.

The rod may have a dimension in which a portion of the coil spring is disposed in the inner circumference of the tubular member in a state where the coil spring is at its natural length. In this case, when the rod is inserted into the tubular member during assembly, the rod can be prevented from being off-center with respect to the tubular member. This prevents the rod from being caught on the tubular member when the rod is inserted into the tubular member.

The swing member may have a housing portion in which a portion of the coil spring is housed. The housing portion may have an opening into which the coil spring is inserted. The coil spring may have a tight wound portion that is movable into and out of the opening. In this case, when the coil spring is compressed in accordance with the swinging of the bail arm, the coil spring wires may be prevented from being caught in the opening.

The swing member may have a housing portion in which a portion of the coil spring is housed. The housing portion may have an opening into which the coil spring is inserted. The coil spring may have a first end that is housed in the housing portion and a second end that is exposed from the housing portion. The second end may have an inner diameter smaller than the inner diameter of the first end. In this case, the gap between the rod and the coil spring becomes smaller at the second end, which prevents the coil spring from rattling. This also prevents the coil spring from being caught in the opening of the housing when the coil spring moves with the rod while being compressed in accordance with the swinging of the bail arm, thereby preventing the coil spring wires from being caught in the opening of the housing.

According to the present invention, the overall length of the rod connected to the bail arm can be shortened in spinning reels.

DETAILED DESCRIPTION

Figure 1:
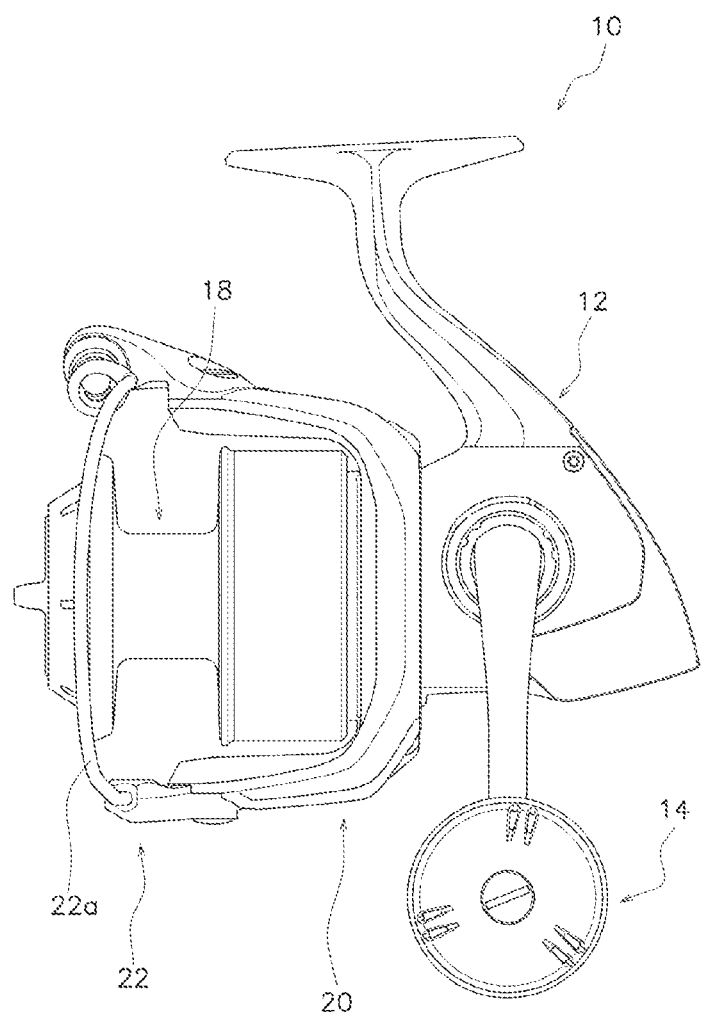
FIG. 1 is a side view of a spinning reel.
Figure 2:
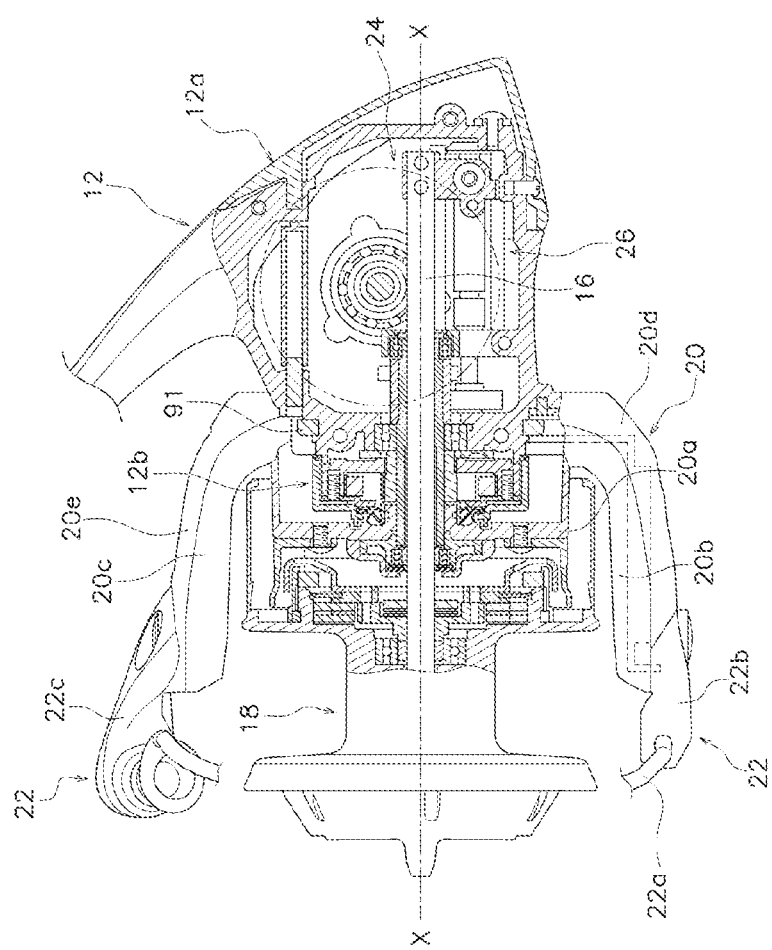
FIG. 2 is a longitudinal sectional view of the spinning reel.

FIG. 1 is a side view of a spinning reel 10 in which an embodiment of the present invention is employed. FIG. 2 is a longitudinal sectional view of the spinning reel 10 in which the embodiment of the present invention is employed. As shown in FIGS. 1 and 2, the spinning reel 10 includes a reel body 12, a handle 14, a spool shaft 16, a spool 18, a rotor 20, and bail arm 22.

In the following explanations, a direction in which an axis X of the spool shaft 16 extends is referred to as an axial direction, a direction orthogonal to the axis X is referred to as a radial direction, and a direction around the axis X is referred to as a circumferential direction. The direction in which a fishing line is fed is described as forward and the opposite direction is backward.

As shown in FIG. 2, the reel body 12 has a reel body portion 12a and a cylindrical portion 12b. The reel body portion 12a has an internal space. The internal space houses a rotor drive mechanism 24 by which the rotor 20 is driven and an oscillating mechanism 26 configured to uniformly wind the fishing line on the spool 18. The cylindrical portion 12b extends forward from the front of the reel body portion 12a.

The handle 14 is rotatably supported by the reel body 12. The handle 14 is disposed on the left side of the reel body 12. The handle 14 can be disposed on the right side of the handle body.

The spool shaft 16 extends in a front-back direction. The spool shaft 16 is supported by the reel body 12 to be movable in the front-back direction.

A fishing line is wound around the outer circumference of the spool 18. The spool 18 is attached to the front of the spool shaft 16. The spool 18 moves forward and backward integrally with the spool shaft 16 in accordance with the rotation of the handle 14.

The rotor 20 is a member to wind a fishing line around the spool 18. The rotor 20 rotates around the spool shaft 16 through the rotor drive mechanism 24 in accordance with the rotation of the handle 14. The rotor 20 has a rotor body portion 20a, a first rotor arm 20b, a second rotor arm 20c, a first cover 20d, and a second cover 20e.

Figure 3:
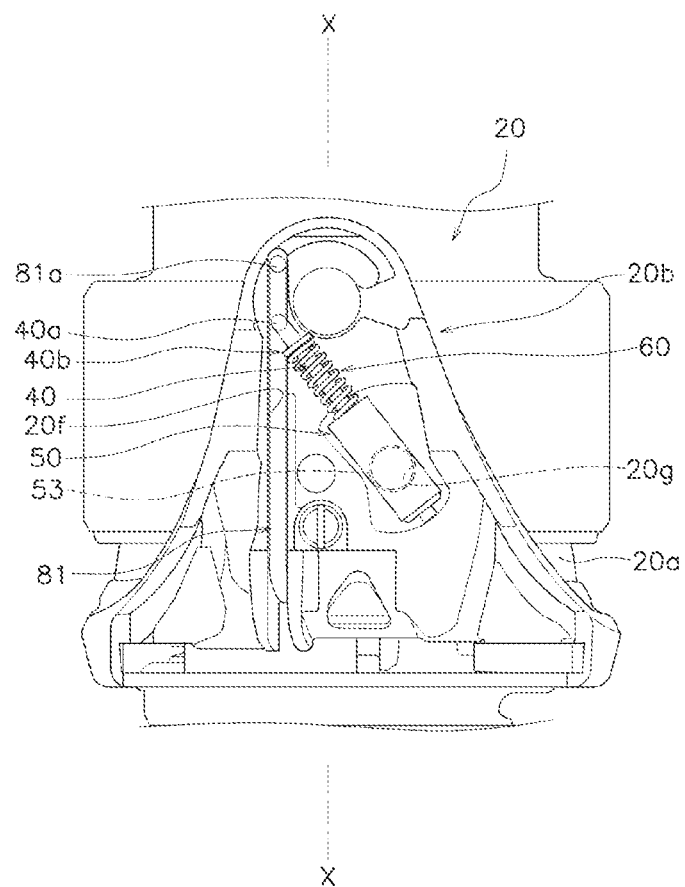
FIG. 3 shows a view of the area around a first rotor arm viewed from radially outside.

The rotor body portion 20a is disposed on the outer periphery of the cylindrical portion 12b of the reel body 12. The first rotor arm 20b and the second rotor arm 20c extend in the front-back direction around the outer periphery of the rotor body portion 20a. The first rotor arm 20b and the second rotor arm 20c are connected to the rotor body portion 20a at their rear ends, respectively. The first rotor arm 20b and the second rotor arm 20c are positioned radially opposite with respect to each other in a state where the rotor body portion 20a is interposed therebetween. As shown in FIG. 3, the first rotor arm 20b has a guide groove 20f The guide groove 20f extends in the axial direction. The guide groove 20f is open in the radial direction.

The first cover 20d is fixed to the first rotor arm 20b. The first cover 20d covers the first rotor arm 20b from the outside in the radial direction. The second cover 20e is fixed to the second rotor arm 20c. The second cover 20e covers the second rotor arm 20c from the outside in the radial direction.

The bail arm 22 is configured to swing with respect to the rotor 20. The bail arm 22 is swingably attached to the tips of the first rotor arm 20b and the second rotor arm 20c, respectively. The bail arm 22 swings between a winding posture and a releasing posture. The winding posture is a posture in which the fishing line is wound around the spool 18. The releasing posture is a posture in which the fishing line wound on the spool 18 is fed.

The bail arm 22 has a bail 22a, a first bail support member 22b, and a second bail support member 22c. The bail 22a connects the first bail support member 22b and the second bail support member 22c. The bail 22a extends in an arc shape between the first bail support member 22b and the second bail support member 22c.

Figure 5:
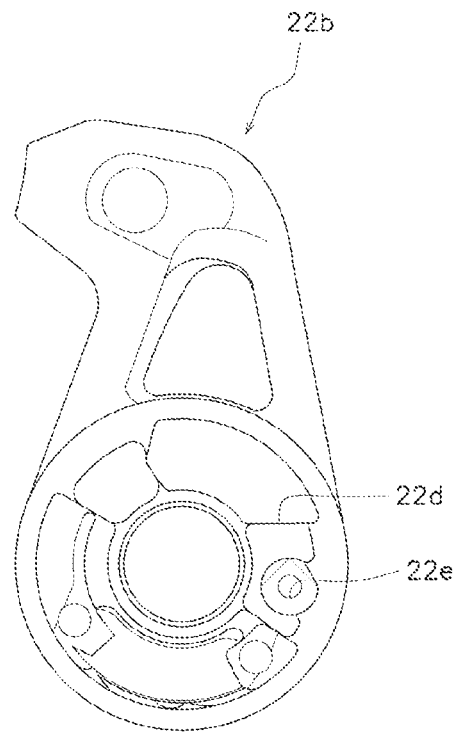
FIG. 5 shows a first bail support member viewed from radially inside.

The first bail support member 22b is swingably attached to the tip of the first rotor arm 20b. The first bail support member 22b supports one end of the bail 22a. As shown in FIG. 5, the first bail support member 22b has an engagement recess 22d and an engagement hole 22e. The engagement recess 22d extends in the circumferential direction. The engagement recess 22d and the engagement hole 22e are formed inside the first bail support member 22b. The engagement recess 22d and the engagement hole 22e have a shape recessed from radially side to radially outside.

The second bail support member 22c is swingably attached to the tip of the second rotor arm 20c. The second bail support member 22c supports the other end of the bail 22a.

Figure 6:
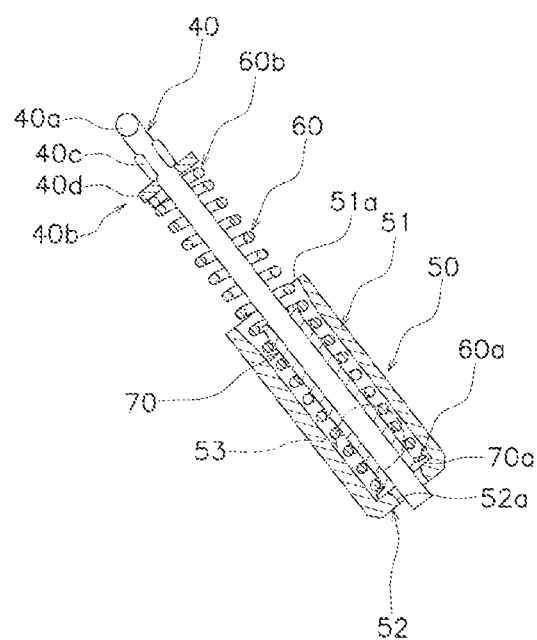
FIG. 6 shows a cross-sectional view of the swing member, a coil spring, and a tubular member.

As shown in FIG. 6, the spinning reel 10 further includes a rod 40, a swing member 50, a coil spring 60, and a tubular member 70. The rod 40, the coil spring 60, the swing member 50, and the tubular member 70 form a retaining mechanism that retains the winding posture or the releasing posture of the bail arm 22. The retaining mechanism is disposed between the first rotor arm 20b and the first cover 20d.

The rod 40 is made of metal wire. The rod 40 is connected to the first bail support member 22b. The rod 40 swings with the swing member 50. The rod 40 is slidably supported by the tubular member 70. The rod 40 is disposed in the inner circumference of the coil spring 60.

Figure 4:
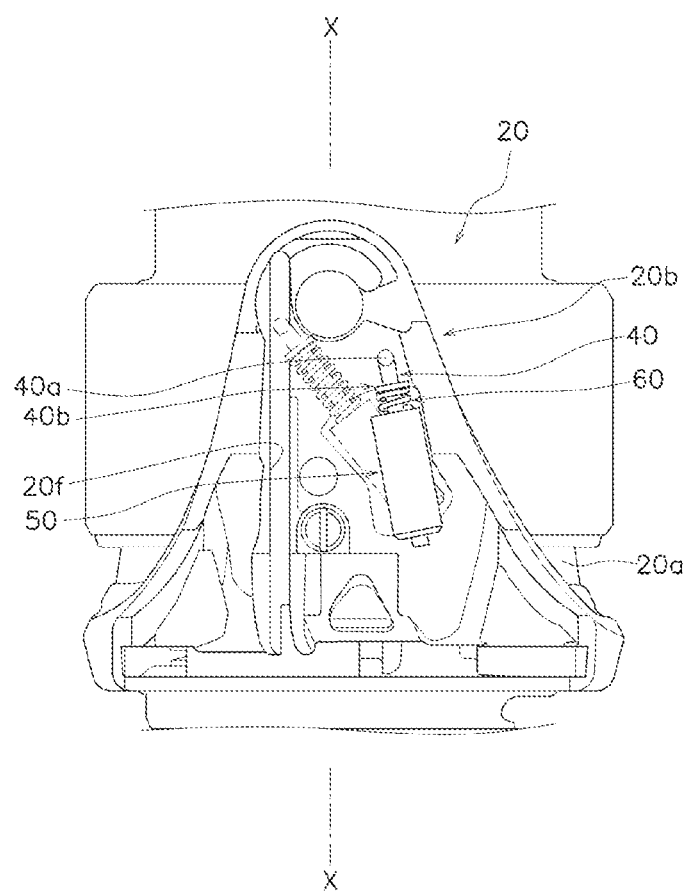
FIG. 4 schematically shows a swing member moving from a first position to a second position.

The rod 40 has a locking projection 40a and a pressing portion 40b. The locking projection 40a is formed at the front end of the rod 40. The locking projection 40a has a bent shape toward the first bail support member 22b. The locking projection 40a is engaged with the engagement hole 22e of the first bail support member 22b. The pressing portion 40b contacts the front end of the coil spring 60. The pressing portion 40b presses the coil spring 60 in accordance with the swing movement of the rod 40. In more detail, the pressing portion 40b includes a projection 40c and a washer 40d. The projection 40c restricts the movement of the washer 40d. The washer 40d is positioned between the projection 40c and the coil spring 60. In FIGS. 3 and 4, the projection 40c is not shown.

The swing member 50 is supported by the rotor 20 in a swingable manner. The swing member 50 swings between the first position shown in FIG. 3 and the second position shown in FIG. 4. The first position corresponds to the winding posture of the bail arm 22 and the second position corresponds to the releasing posture of the bail arm 22. That is, the swing member 50 is located in the first position in a case where the bail arm 22 is in the winding posture, and the swing member 50 is located in the second position in a case where the bail arm 22 is in the releasing posture.

The swing member 50 has a housing portion 51, a bottom 52, and a projection portion 53. The housing portion 51 is tubular in shape. The housing portion 51 houses a part of the coil spring 60. The housing portion 51 has an opening 51a into which the coil spring 60 is inserted. The opening Ma is open toward the front. The bottom 52 is disposed at the rear end of the housing portion 51. The bottom 52 supports the coil spring 60. In this embodiment, the bottom 52 supports the coil spring 60 via the tubular member 70. The bottom 52 has a through hole 52a through which the rod 40 can extend.

The projection portion 53 is projected from the outer circumference of the housing portion 51 toward the first rotor arm 20b. The projection portion 53 is formed in a column shape. As shown in FIG. 3, the projection portion 53 is swingably disposed in the cylindrical recess 20g provided in the first rotor arm 20b. With the projection portion 53, the swing member 50 is swingably supported by the first rotor arm 20b.

The coil spring 60 presses the bail arm 22 to the winding posture and the releasing posture, respectively, in accordance with the swinging of the bail arm 22. The coil spring 60 is disposed around the outer circumference of the rod 40. The coil spring 60 presses the rod 40 toward the first bail support member 22b. In more detail, the coil spring 60 presses the pressing portion 40b, and thereby presses the rod 40 toward the front end of the first bail support member 22b. The coil spring 60 also presses the tubular member 70 toward the bottom 52 of the swing member 50. In the winding posture and the releasing posture, the coil spring 60 is in a compressed state.

Figure 7:
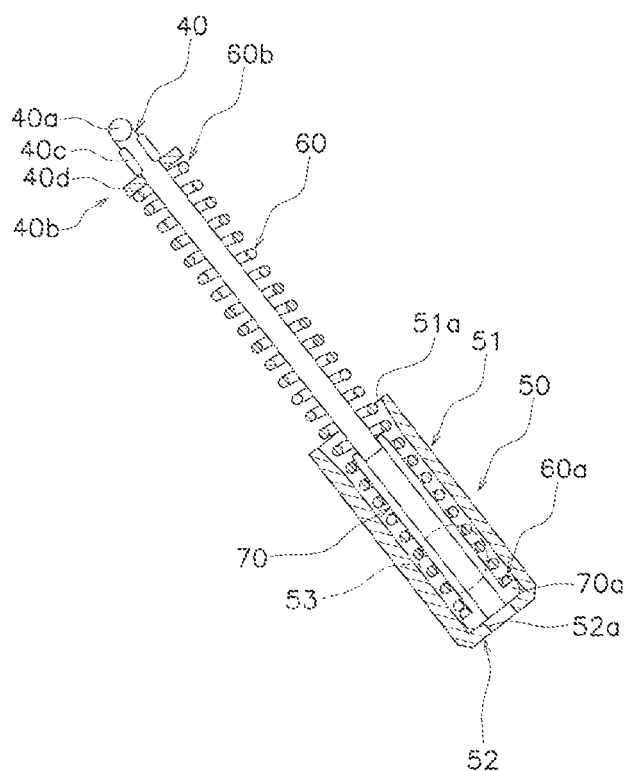
FIG. 7 shows a cross-sectional view of the swing member, the coil spring, and the tubular member in a state where the coil spring is at its natural length.

FIG. 7 shows the coil spring 60 in its natural length. As shown in FIG. 7, in a state where the coil spring 60 is in its natural length, the rod 40 preferably has a dimension that allows a part (in this case, the rear end) of the rod 40 to be positioned in the inner circumference of the tubular member 70. In a state where the coil spring 60 does not press the rod 40, i.e., in a state where the coil spring 60 is not compressed, the rod 40 preferably has a dimension such that the rear end thereof is disposed at the inner circumference of the tubular member 70. FIG. 6 shows the swing member 50 in the first position. Therefore, in FIG. 6, the coil spring 60 is in a compressed state.

The coil spring 60 has a first end portion 60a and a second end portion 60b. The first end portion 60a is housed in the housing portion 51. The second end portion 60b is exposed from the housing portion 51.

The tubular member 70 is separate from the swing member 50. The tubular member 70 is supported by the swing member 50. The tubular member 70 is housed in the housing portion 51 of the swing member 50. The tubular member 70 does not protrude from the opening 51a. The tubular member 70 is positioned behind the opening 51a. The tubular member 70 extends in a direction along the housing portion 51. The tubular member 70 is open at both ends. The tubular member 70 is disposed in the inner circumference of the coil spring 60.

The tubular member 70 slidably supports the rod 40. The tubular member 70 allows the rod 40 to slide along the inner circumference in accordance with the swinging of the bail arm 22.

The tubular member 70 has a flange 70a. The flange 70a is formed at the rear end of the tubular member 70. The flange 70a contacts the bottom 52 of the swing member 50 in the housing portion 51. The flange 70a is pressed toward the bottom 52 of the swing member 50 by the coil spring 60.

Figure 8:
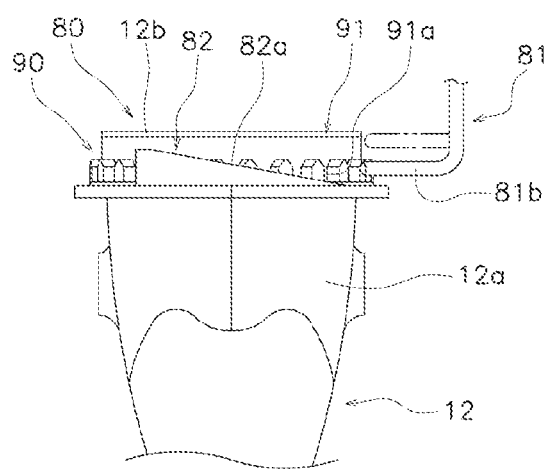
FIG. 8 shows a view of a switching member viewed from radially outside.

As shown in FIG. 8, the spinning reel 10 further includes a reversing mechanism 80 and a rotor braking mechanism 90. The reversing mechanism 80 returns the bail arm 22 back to the winding posture in accordance with the rotation of the rotor 20 when the bail arm 22 is held in the releasing posture.

The reversing mechanism 80 has a moving member 81 and a switching member 82. The rod 40, the swing member 50, the coil spring 60, and the tubular member 70 form a part of the reversing mechanism 80.

The moving member 81 is made of metal wire. As shown in FIG. 3, the moving member 81 extends in the axial direction. The moving member 81 moves in the front-back direction along the guide groove 20f of the first rotor arm 20b in accordance with the swing movement of the bail arm 22.

The moving member 81 has a first end portion 81a and a second end portion 81b. The first end portion 81a has a radially outwardly bent shape. The first end portion 81a is engaged with the engagement recess 22d of the first bail support member 22b. The second end portion 81b has a radially inwardly bent shape. The second end portion 81b is engaged with the switching member 82.

The switching member 82 is fixed to the reel body 12. When the bail arm 22 is held in the releasing posture, the second end portion 81b of the moving member 81 contacts the switching member 82 in accordance with the rotation of the rotor 20. The switching member 82 has an inclined surface 82a. When the second end portion 81b of the moving member 81 passes through the inclined surface 82a, the first bail support member 22b is pushed forward by the inclined surface 82a so as to swing to a position beyond the dead point. With this, the bail arm 22, which was pushed toward the releasing posture, is pushed toward the winding posture. As a result, the bail arm 22 returns to the winding posture.

The rotor braking mechanism 90 brakes the rotation of the rotor 20 in a state where the bail arm 22 is in the fishing-line releasing posture. The rotor braking mechanism 90 has a braking member 91. The moving member 81 forms a part of the rotor braking mechanism 90. The braking member 91 is slidably disposed in the cylindrical portion 12b of the reel body 12. The braking member 91 has a plurality of recesses 91a. The plurality of recesses 91a are arranged so that the second end portion 81b of the moving member 81 is engaged therewith in a case where the bail arm 22 is in the releasing posture. When the rotor 20 attempts to rotate in a case where the bail arm 22 is in the fishing-line releasing posture, the cylindrical portion 12b of the reel body 12 and the braking member 91 are frictionally engaged, and thereby the rotation of the rotor 20 is braked.

In the spinning reel 10 with the above configuration, the rod 40 slides with respect to the tubular member 70 disposed in the inner circumference of the coil spring 60 in accordance with the swinging of the bail arm 22. In other words, since the rod 40 is slidably supported by the tubular member 70 in the inner circumference of the coil spring 60, the overall length of the rod 40 can be shortened. As a result, the swing range of the rod 40 becomes smaller, and thus, the first cover 20d which covers the outside of the first rotor arm 20b can be suppressed from becoming larger, for example.

Other Embodiments

Although one embodiment of the present invention has been described above, the present invention is not limited to the above embodiment, and various modifications are possible without departing from the gist of the present invention. In particular, the embodiments and modifications described herein can be arbitrarily combined as necessary.

Figure 9:
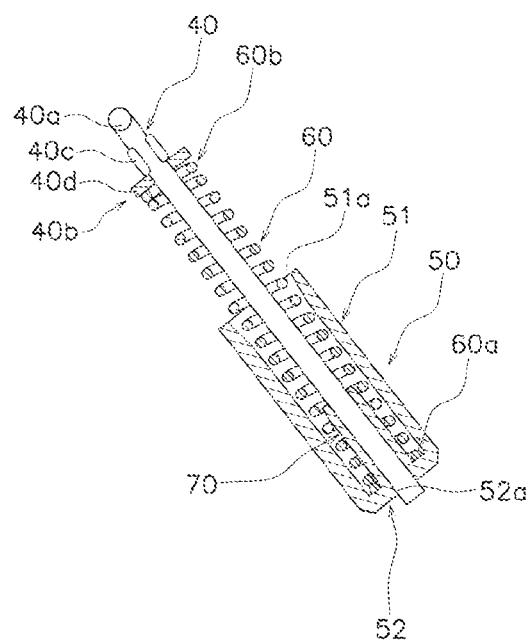
FIG. 9 shows a cross-sectional view of a swing member, a coil spring, and a tubular member according to another embodiment.

In the above embodiment, the tubular member 70 is separate from the swing member 50. As shown in FIG. 9, however, the tubular member 70 can be integral with the swing member 50.

Figure 10:
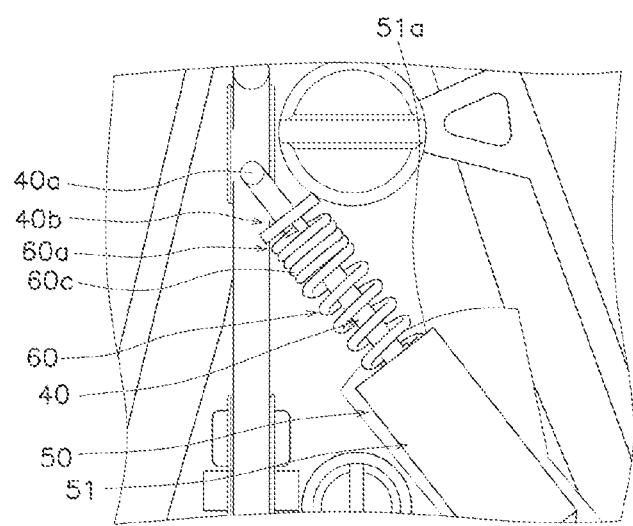
FIG. 10 illustrates a modified example of the coil spring.
Figure 11:
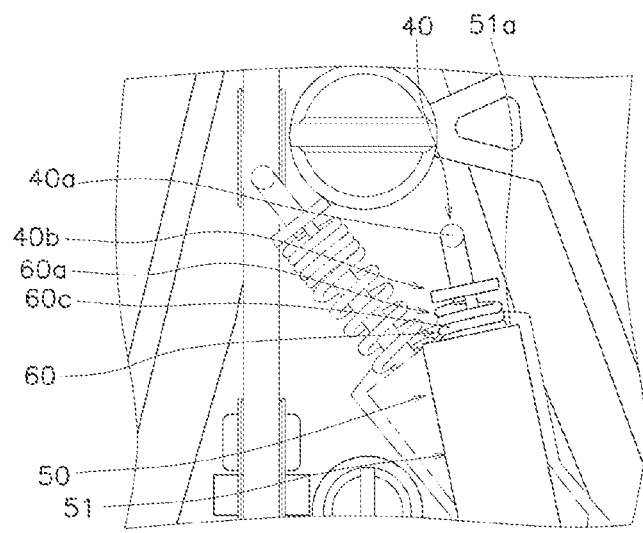
FIG. 11 illustrates the modified example of the coil spring.

As shown in FIGS. 10 and 11, the coil spring 60 can include a tight wound portion 60c. In FIG. 10, the swing member 50 is in the first position. In FIG. 11, the swing member 50 is in the second position. The tight wound portion 60c is disposed in the opening 51a of the housing portion 51 so as to move back and forth. The tight wound portion 60c is located at the second end portion 60b of the coil spring 60. The tight wound portion 60c can be disposed at an intermediate position of the coil spring 60. It only needs to be arranged to move into and out of the opening 51a as the swing member 50 moves from the first position to the second position. Preferably, the tight wound portion 60c is positioned in the opening 51a when the swing member 50 moves to the dead point or a position near the dead point. In a case where the swing member 50 is in the dead point position, the coil spring 60 is at its most compressed state. The tight wound portion 60c can be configured such that a part of the tight wound portion 60c is disposed in the opening 51a in a case where the swing member 50 is in the first position.

Figure 12:
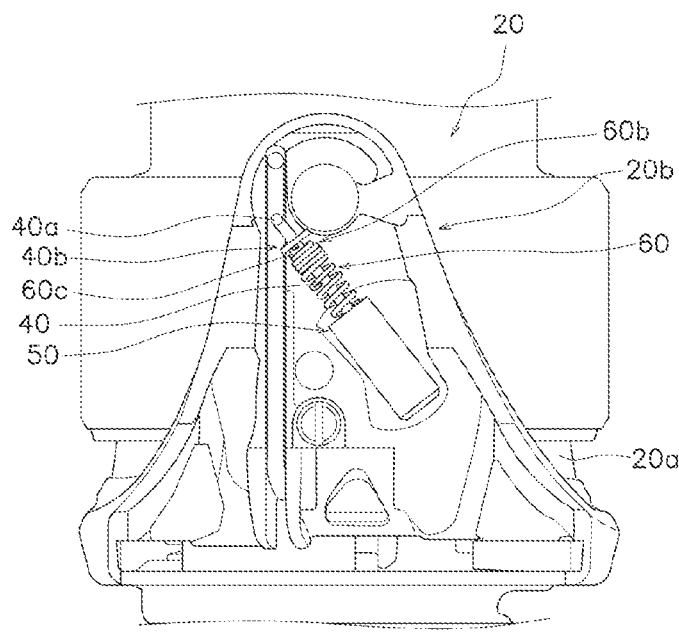
FIG. 12 illustrates another modified example of the coil spring.

As shown in FIG. 12, the second end portion 60b of the coil spring 60 can have an inner diameter smaller than the inner diameter of the first end portion 60a of the coil spring 60. In other words, the second end portion 60b of the coil spring 60 can have a smaller gap with respect to the rod 40 in the radial direction. In addition, the coil spring 60 including the tight wound portion 60c can have an inner diameter smaller than the inner diameter of the first end portion 60a of the coil spring 60.

REFERENCE SIGNS LIST

10 Spinning reel
12 Reel body
20 Rotor
22 Bail arm
22b First bail support member (example of bail support member)
40 Rod
50 Swing member
51 Housing portion
Ma Opening
52 Bottom
60 Coil spring
60a First end portion
60b Second end portion
60c Tight wound portion
70 Tubular member

What is claimed is:

1. A spinning reel comprising:
   a reel body;
   a rotor configured to rotate with respect to the reel body;
   a bail arm configured to swing with respect to the rotor, the bail arm including a bail and a bail support member that supports one end of the bail;
   a rod connected to the bail support member;
   a coil spring disposed around an outer circumference of the rod, the coil spring configured to press the rod toward the bail support member;
   a swing member having a bottom that supports the coil spring, the swing member swingably supported by the rotor; and
   a tubular member supported by the swing member and disposed in an inner circumference of the coil spring, the rod configured to slide in accordance with a swing movement of the bail arm.

2. The spinning reel according to claim 1, wherein the tubular member is integral with the swing member.

3. The spinning reel according to claim 1, wherein the tubular member is separate from the swing member, and the coil spring presses the tubular member toward the bottom of the swing member.

4. The spinning reel according to claim 1, wherein the rod has a dimension configured such that a portion of the rod is disposed in an inner circumference of the tubular member in a state where the coil spring is at a natural length.

5. The spinning reel according to claim 1, wherein the bail support member has a recess that is recessed in a radial direction and extends in a circumferential direction, the rod has a projection formed at an end of the rod, and the projection of the rod is engaged with the recess of the bail support member.

6. The spinning reel according to claim 1, wherein the swing member is configured to swing between a first position and a second position, the first position corresponding to a position in which the bail arm is in a winding posture to wind a fishing line, the second position corresponding to a position in which the bail arm is in a releasing posture to feed a fishing line.

7. The spinning reel according to claim 6, wherein the coil spring is in a compressed state when the swing member is located in the first position or the swing member is located in the second position.

8. The spinning reel according to claim 1, wherein the swing member has a housing portion in which a portion of the coil spring is housed, the housing portion has an opening into which the coil spring is inserted, and the coil spring has a tight wound portion disposed to be movable into and out of the opening.

9. The spinning reel according to claim 8, wherein the swing member has a column-shaped portion that is projected from an outer circumference of the housing portion, and the swing member is swingably supported by the rotor via the column-shaped portion.

10. The spinning reel according to claim 1, wherein the swing member has a housing portion in which a portion of the coil spring is housed, the housing portion has an opening into which the coil spring is inserted, the coil spring has a first end housed in the housing portion and a second end exposed from the housing portion, the second end having an inner diameter smaller than that of the first end.

* * * * *